(12) United States Patent
Saegusa (10) Patent No.: US 6,198,914 B1
(45) Date of Patent: Mar. 6, 2001

(54) EMERGENCY CALL SYSTEM

(76) Inventor: Takao Saegusa, 1-6-803, Seishin-cho 1-chome, Edogawa-ku, Tokyo 134 (JP)

(*) Notice: Subject to any disclaimer, the term of this patent is extended or adjusted under 35 U.S.C. 154(b) by 0 days.

(21) Appl. No.: 08/982,041

(22) Filed: Dec. 10, 1997

(30) Foreign Application Priority Data

Oct. 8, 1997 (JP) .................................................. 9-275403

(51) Int. Cl.$^7$ .................................................. H04Q 7/20
(52) U.S. Cl. .......................................... 455/404; 455/457
(58) Field of Search .................................. 455/404, 421, 455/456, 457; 342/357.09, 357.1, 357.07; 340/988, 990, 460, 692; 379/368

(56) References Cited

U.S. PATENT DOCUMENTS

| | | | |
|---|---|---|---|
| 3,662,267 | * 5/1972 | Reed | 325/53 |
| 5,534,851 | * 7/1996 | Russek | 340/573 |
| 5,587,715 | * 12/1996 | Lewis | 342/357 |
| 5,712,619 | * 1/1998 | Simkin | 340/539 |
| 5,873,040 | * 2/1999 | Dunn et al. | 455/456 |
| 5,890,061 | * 3/1999 | Timm et al. | 455/404 |
| 5,937,355 | * 8/1999 | Joong et al. | 455/466 |

* cited by examiner

Primary Examiner—Nguyen Vo
Assistant Examiner—N. Mehrpour
(74) Attorney, Agent, or Firm—Arent Fox Kintner Plotkin & Kahn, PLLC (57) ABSTRACT

Upon occurrence of any emergent state for a user, the user depresses an emergency call button of his portable telephone to transmit a signal therefrom to an emergency call center, whereby user ID and positional information of the portable telephone obtained on the basis of signals from GPS satellites are sent to the emergency call center. DGPS generates a correcting signal out of the positional information based on both the signals from the GPS satellites and the positional information of a fixed station, and then transmits such correcting signal to the emergency call center. In response to a terminating call from the portable telephone and reception of the user ID, the emergency call center outputs the individual information of the user to a display device and corrects the positional information of the portable telephone in accordance with the correcting signal, and makes contact with a hospital or a fire station while displaying the map information of the vicinity around the corrected position on the display device.

6 Claims, 8 Drawing Sheets

Group type
  Block 1: Program ID
  Block 2: Contents of data services
  Block 3,4: Detailed Contents of services

FIG. 6C

Block 2
  Setting of emergency call system

FIG. 6D

Block 3,4
  DGPS correcting signal

FIG. 7

EMERGENCY CALL SYSTEM

BACKGROUND OF THE INVENTION

1. Field of the Invention

The present invention relates to an emergency call system adapted for notifying an emergency call center about occurrence of an emergent state to ask for rapid measures to be taken.

2. Description of the Related Art

For any aged person or outpatient (of heart disease for example), there may occur some emergent situation inclusive of sudden attack of illness while the person is out. Therefore, upon occurrence of any emergent state, it is essentially necessary for him to receive an exact and quick primary measure and also to make fast contact with an ambulance or hospital to take a secondary measure.

It has been customary in the related art heretofore to employ a system where, upon occurrence of any emergent state on a patient or aged person in a hospital or old-people's home, the person depresses a button of a portable audio oscillator carried by himself to generate an audio signal, which is then received by any of a plurality of receiving alarm units installed in a relevant supervisory region, and a notice signal inclusive of identification data to specify the received point is transmitted to a center station.

In this system, a contact terminal unit capable of making contact with the audio signal generation point is connected to the center station via a contact unit, so that communication is rendered possible between the center station and the spot. However, there exists a problem in the known emergency call system that, although it is possible to deal with any emergency that occurs in the supervisory region where the system is installed, such as in a hospital or old-people's home, a proper measure fails to be performed with regard to any emergent state caused when the person is out of the region.

Another problem is also existent in that any outpatient who attends a hospital for medical treatment without being hospitalized, such as a heart-disease patent or aged person, is unable to report an emergent state caused during his being out, whereby a required rapid measure fails to be taken.

SUMMARY OF THE INVENTION

It is therefore an object of the present invention to provide an emergency call system which enables any person to report an emergent state for receiving a rapid measure.

In accordance with an aspect of the present invention, there is provided an emergency call system having an emergency call mobile station to transmit emergency information and an emergency call center to receive the emergency information. The emergency call mobile station comprises a locating means for detecting the position of the self station and generating first positional information; an emergency switch means to be turned on or off; an emergent state detection means for outputting an emergent state detection signal when the emergency switch means is in its on-state; and a transmitting means for transmitting to the emergency call center the emergency information which includes both the first positional information and identification information to specify the user of the emergency call mobile station.

The emergency call center comprises a map information database where map information is stored; an individual information database where individual information relative to the user is stored; a positional information receiving means for receiving the first positional information included in the emergency information; a display means for displaying the information; a position display means for displaying, on the display means, the map information around the position of the emergency call mobile station by referring to the map information database on the basis of the first positional information; and an individual information display means for displaying, on the display means, the individual information of the user by referring to the individual information database on the basis of the identification information included in the emergency information.

Preferably, the emergency detection means is so structured as to output the emergency detection signal when the emergency switch means is turned to its on-state after a lapse of a predetermined time, whereby it is rendered possible to eliminate misreport to the emergency call center that may otherwise be caused by an erroneous manipulation of the emergency switch means.

More preferably, the emergency call mobile station further comprises a message storage means for storing a message, a speaker for emitting an audio output, and a message output means for outputting the message to the speaker in response to the emergency detection signal. Thus, an exact and rapid primary measure can be taken upon occurrence of an emergent state to the user.

According to the present invention, the user of the emergency call mobile station turns on the emergency switch means upon occurrence of an emergent state. When the emergency switch means is in its on-state, the emergent state detection means outputs an emergent state detection signal. In response to this emergent state detection signal, the transmitting means transmits to the emergency call center the emergency information which includes both the first positional information obtained from the locating means and the identification information to specify the user of the relevant emergency call mobile station.

Then the emergency information receiving means receives the first positional information, and the position display means displays the map information around the position of the emergency call mobile station on the display means, whereby the position of the user is specified. Meanwhile the individual information display means displays the individual information of the user on the display means, so that a rapid measure can be executed for the user.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Hereinafter a preferred embodiment of the present invention will be described in detail with reference to the accompanying drawings.

Figure 1:
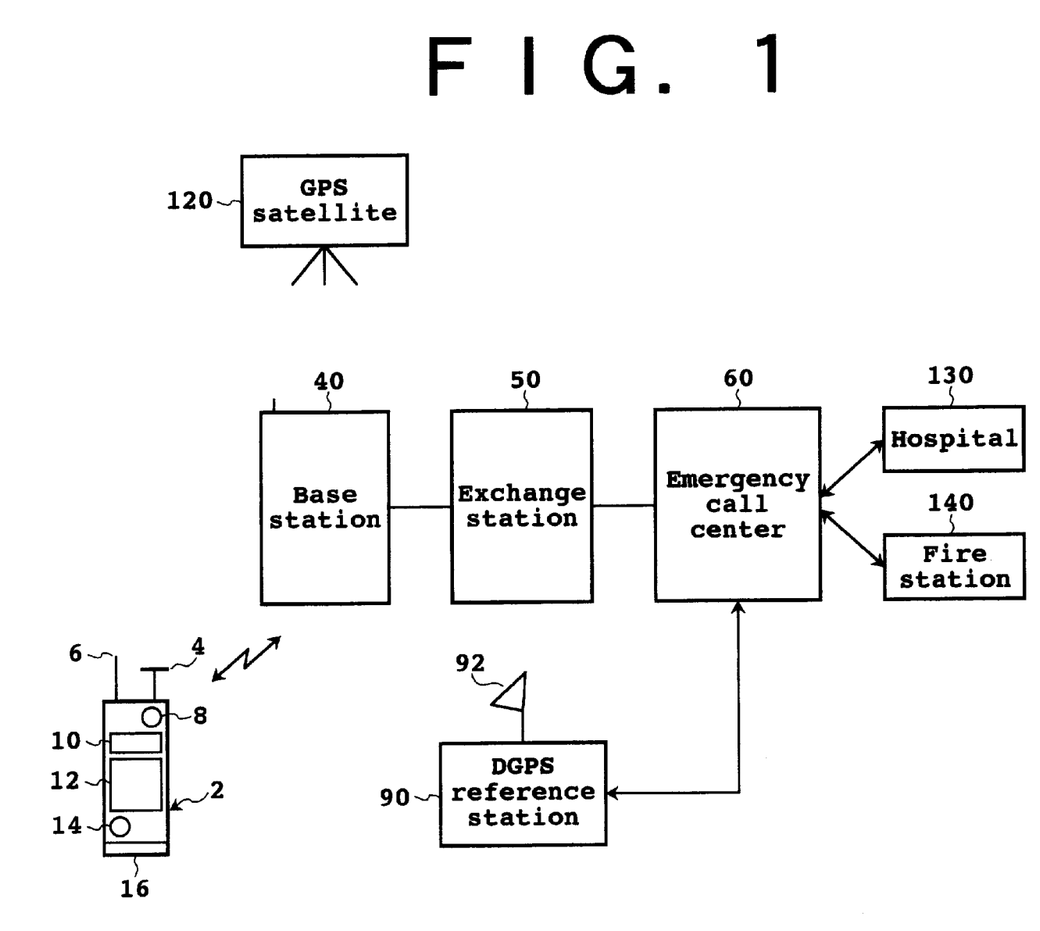
FIG. 1 is an overall block diagram of an emergency call system in an embodiment of the present invention.

FIG. 1 is an overall block diagram of an emergency call system in the embodiment of the present invention. As shown in this diagram, the emergency call system comprises a portable telephone or cellular telephone 2, a base station 40, an exchange station 50, an emergency call center 60, a differential GPS (DGPS) reference station 90, a GPS satellite 120, a hospital 130 and a fire station 140.

Figure 2:
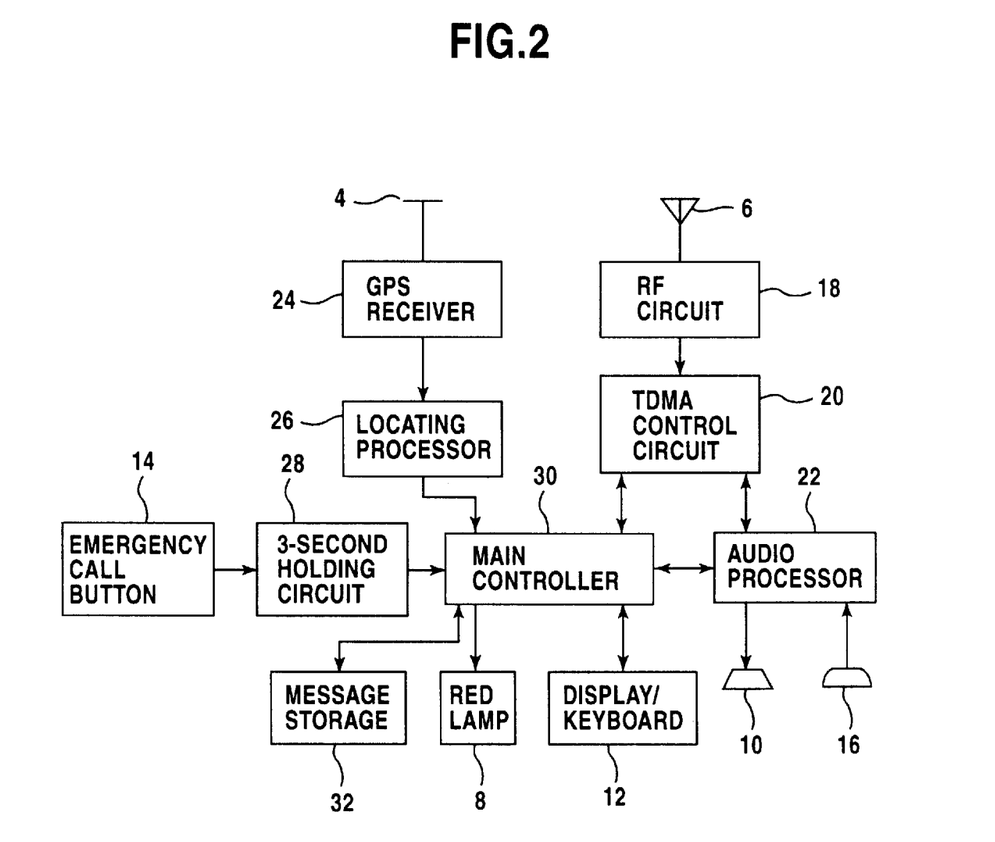
FIG. 2 is a functional block diagram of a portable telephone included in FIG. 1.

FIG. 2 is a functional block diagram of a portable telephone included in FIG. 1. The portable telephone 2 has, in addition to normal functions of an ordinary portable telephone, some special functions to execute proper processes upon occurrence of an emergent state, including instruction to the user of the portable telephone to take a primary measure, transmission of occurrence of an emergent state and positional information of the user to an emergency call center 22, and instruction from the emergency call center 22 to the user. The portable telephone 2 comprises a GPS receiving antenna 4, a transmitting/receiving antenna 6, a red lamp 8, a speaker 10, a display/keyboard 12, an emergency call button 14, a microphone 16, an RF circuit 18, a TDMA control circuit 20, an audio processor 22, a GPS receiver 24, a locating processor 26, a 3-second holding circuit 28, a main controller 30 and a message storage 32.

The GPS antenna 4 serves to receive signals from the GPS satellites 120. The transmitting/receiving antenna 6 serves for transmission of radio waves to and reception of the same from the base station 40. The red lamp 8 is turned on to indicate that occurrence of an emergent state of the user has been reported to the emergency call center 60. This is not limited to the red lamp 8 alone, and may be any other means such as a bell for example to inform nearby persons of the emergent state.

The speaker 10 serves to emit sound waves to the outside. The display/keyboard 12 is used for displaying characters and so forth and also for inputting a dial number or the like so as to function as a portable telephone also. The emergency call button 14 is depressed by the user upon occurrence of an emergent state. The microphone 16 inputs sound waves, and the RF circuit 18 is used for demodulation of a channel received from the base station 40 and also for modulation to transmit traffic data through the communication channel allocated to the base station 40.

The TDMA control circuit 20 generates, in response to the instruction from the main controller 30, traffic data of audio signal or data signal in a time slot allocated to the portable telephone 2 by the base station 40. The audio processor 22 executes, by VSLP or the like, audio compression or expansion of the audio signal input from the microphone 10. The GPS receiver 24 demodulates the signal of the channel of the specified GPS satellite 120 out of the entire signals received by the GPS antenna 24. The locating processor 26 calculates the position on the basis of the signals received from three or more GPS satellites 120 and then outputs positional information (latitude and longitude).

Although the calculation in this embodiment is executed by satellite navigation from the positional information based on the signals from the GPS satellites 120, some other radio navigation may also be adopted, such as approach radio navigation which determines the position by receiving positional information from a ground sign post. The 3-second holding circuit 28 activates an emergent state detection signal after detecting that the emergency call button 14 has been depressed continuously for more than a predetermined time, e.g., three seconds. The reason for providing the 3-second holding circuit 28 here resides in preventing any misreport to the emergency call center 60 that may otherwise be caused by erroneous depression of the button.

The main controller 30 executes control actions when the emergent state detection signal is activated, in such a manner as to perform operations of communicating with the base station 40 to transmit the user ID (e.g., portable telephone number for specifying the user) and the positional information to the emergency call center 60, storing the message information, which represents the content of the primary measure to be taken for the user, in the message storage 32 and, upon occurrence of an emergent state, outputting the message information to the speaker 10 and blinking the red lamp 8. The message storage 32 is a memory for storing the content of the predetermined primary measure to be taken for the user upon occurrence of an emergent state to the user. The base station 40 is capable of communicating with the portable telephone 2, and the exchange station 50 is a telephone exchange for communication with the base station 40 and so forth. The base station 40 and the emergency call center 60 are connected to each other via a telephone line.

Figure 3:
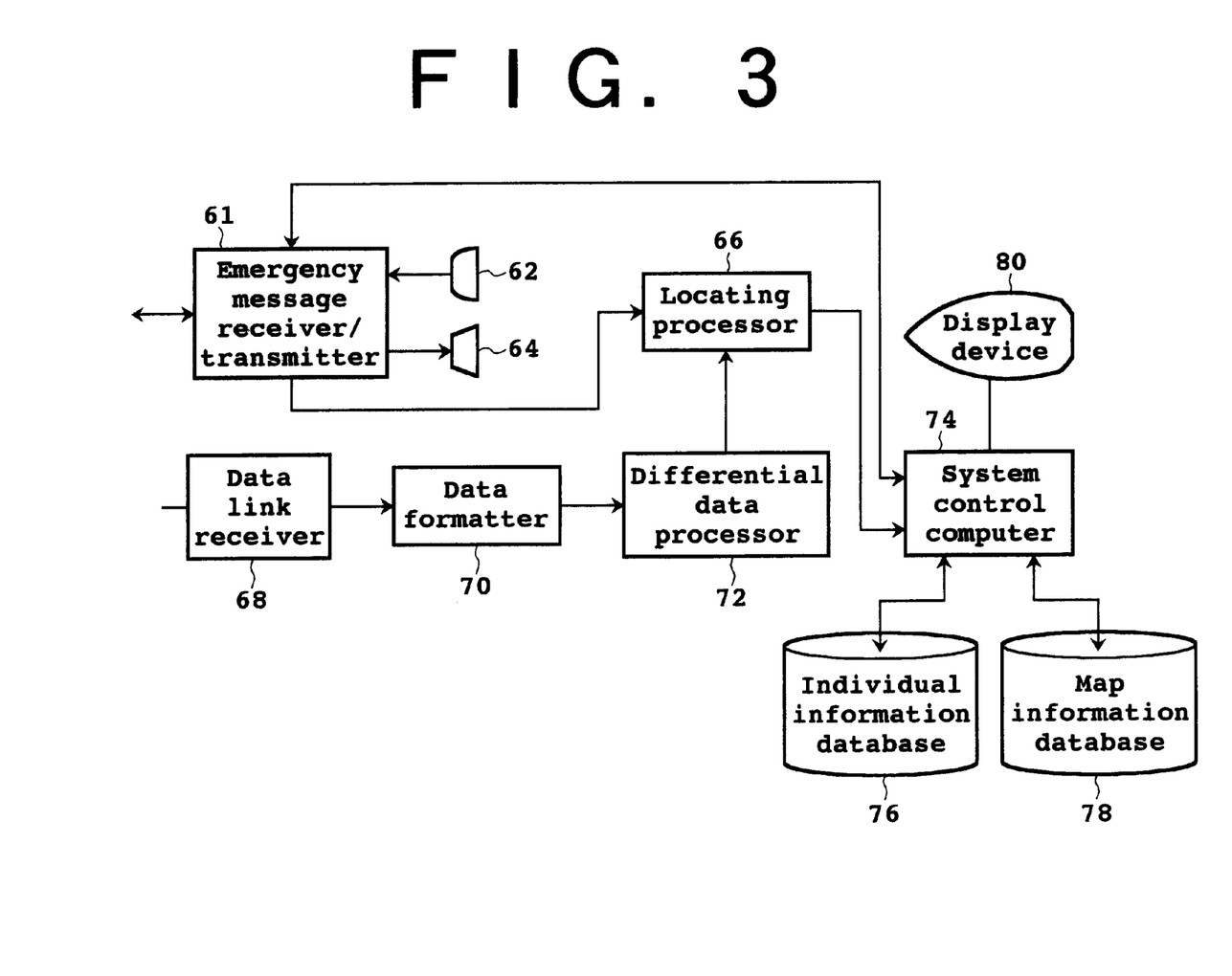
FIG. 3 is a functional block diagram of an emergency call center in FIG. 1.

FIG. 3 is a functional block diagram of the emergency call center included in FIG. 1. The emergency call center 60 receives the user ID and the positional information from the portable telephone 2 and displays the individual information relative to the user of the portable telephone 2 to thereby notify the user about the content of the necessary measure to be taken, and further calculates the exact position of the user with correction of the positional information of the user on the basis of the correcting information obtained from the DGPS reference station 90, then displays the map of the vicinity around the position, and makes telephone contact with the hospital 130 or the fire station 140 for a request of dispatch to the user.

The emergency call center 60 comprises an emergency message receiver/transmitter 61, a microphone 62, a speaker 64, a locating processor 66, a data link receiver 68, a data formatter 70, a differential data processor 72, a system control computer 74, an individual information database 76, a map information database 78 and a display device 80. The emergency message receiver/transmitter 61 receives, via a telephone line or the like, the emergency message including the user ID and the positional information, then outputs the positional information to the locating processor 66 while outputting the user ID to the system control computer 74, and transmits to the telephone line the audio signal input from the microphone 62, and further outputs the audio signal to the speaker 64.

The microphone 62 inputs the audio signal, and the speaker 64 outputs the audio signal. The locating processor 66 inputs the positional error (correction latitude, correction longitude) obtained from the differential data processor 72, then corrects the positional information of the user and calculates the exact positional information. The data link receiver 68 receives the positional correcting signal transmitted from the DGPS reference station 90 via an exclusive line or the like. The data formatter 70 checks the validity of the formatted correcting signal and extracts the correcting information therefrom. The differential data processor 72 receives the positional correcting information from the data formatter 70 and then calculates the positional error.

The system control computer 74 inputs the user ID from the emergency message receiver/transmitter 61 while inputting the positional information from the locating processor 66, then searches the individual information database 76 and displays the retrieved individual information of the user on the display device 80. The computer 74 further searches the map information database 78 and displays the retrieved map information inclusive of the user's position on the display device 80. The individual information database 76 is a database file to store the user's individual information required for instruction of a secondary measure for the user, and the individual information is composed of the user's clinical record for example. The map information database 78 is a database file to store the map information. And the display device 80 serves to display the individual information or the map thereon.

Figure 4:
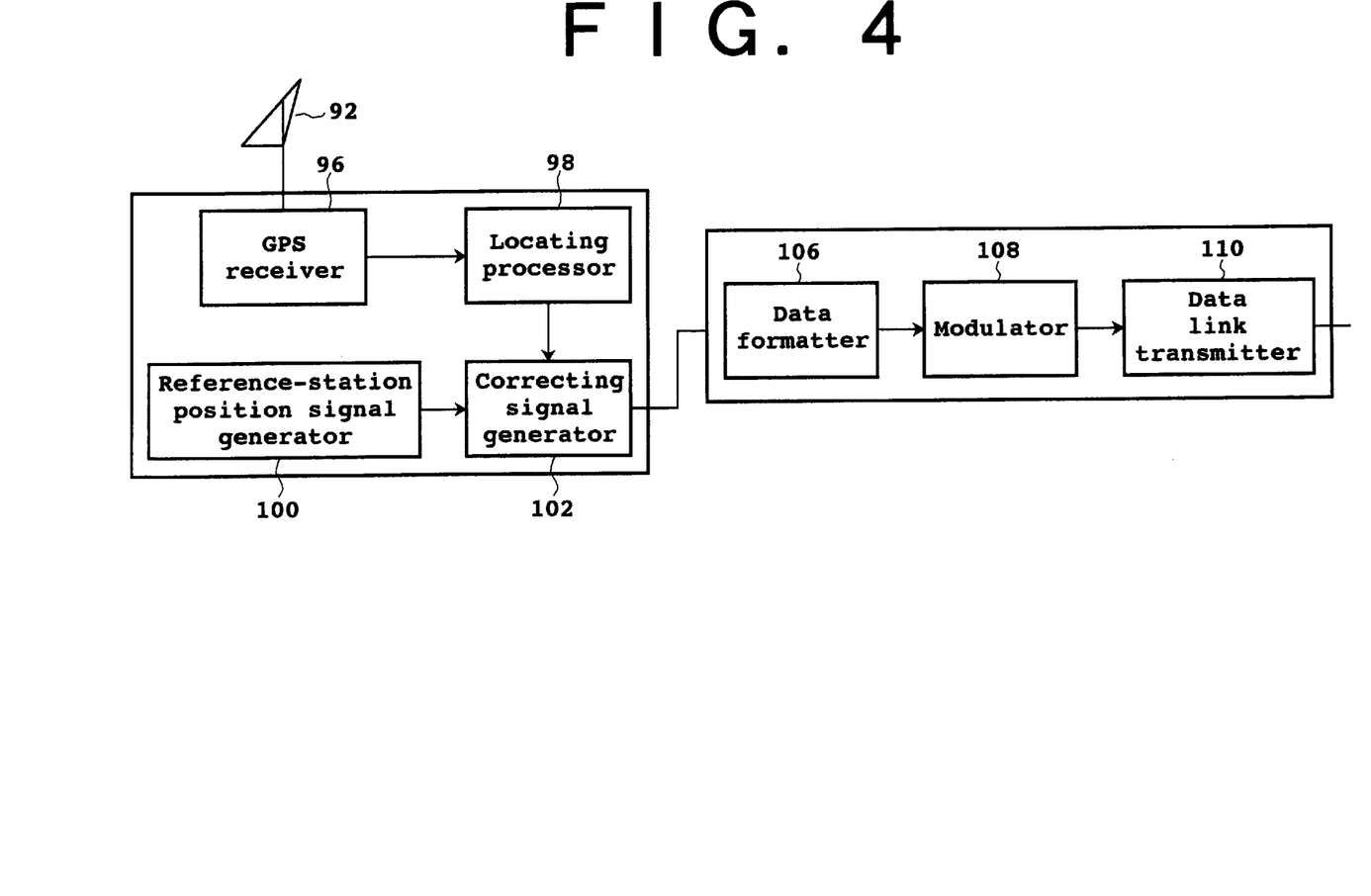
FIG. 4 is a functional block diagram of a DGPS reference station in FIG. 1.

FIG. 4 is a functional block diagram of the DGPS reference station included in FIG. 1. The DGPS reference station 90 is a fixed station which is positionally known and generates a correcting signal out of the known positional information and the calculated positional information obtained on the basis of the signals from the GPS satellites 120. This station 90 has a GPS antenna 92, a GPS receiver 96, a locating processor 98, a reference-station position signal generator 100, a correcting signal generator 102, a data formatter 106, a modulator 108 and a data link transmitter 110.

The GPS antenna 92 is employed for receiving the signals from the GPS satellites 120. The GPS receiver 96 demodulates the signal of the channel of the specific GPS satellite 120 out of the entire signals received by the GPS antenna 92. The locating processor 98 calculates the position on the basis of the signals from three or more GPS satellites 120, and then outputs positional information (latitude and longitude). Using the DGPS reference station 90 here is grounded on the following reason. The positional information obtained by the GPS includes an error of 100 m or so due to satellite clock error a, satellite orbit error b, ionospheric delay error c, tropospheric delay error d, receiver noise e, multi-path f and selective usability g. If any error of such order is existent, the user might not be found promptly when an ambulance or the like is dispatched to the user. Therefore, a positional correction is executed on the basis of the correcting signal obtained from the DGPS reference station 90, whereby the calculated user's position is corrected within an error range of 10 m or so.

The reference-station position signal generator 100 outputs known positional information of the reference station, and the correcting signal generator 102 calculates a correcting signal (e.g., with regard to the errors a–g) on the basis of the positional information obtained from the locating processor 98 and the positional information from the reference station. The data formatter 106 is employed for formatting the correcting signal in a predetermined format, and the modulator 108 modulates the formatted correcting signal into a modem signal or the like. And the data link transmitter 110 transmits the modulated correcting signal to an analog exclusive line (e.g., TELNET, FM multiplexer, etc.).

Figure 5:
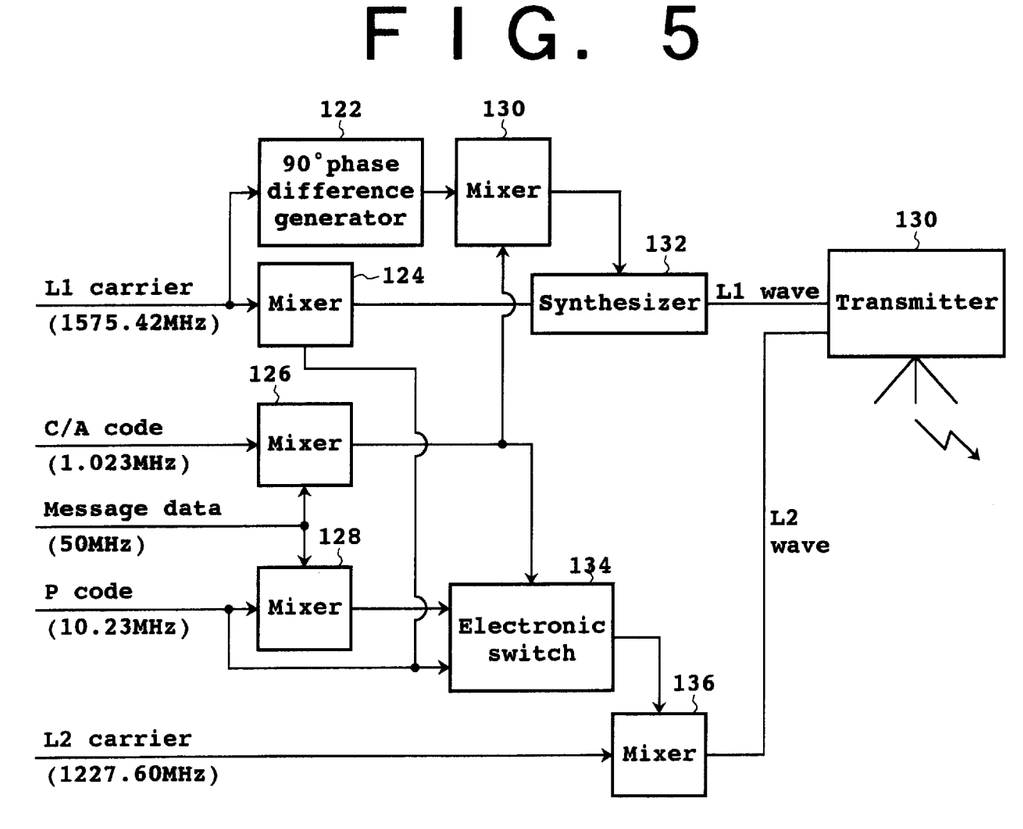
FIG. 5 is a functional block diagram of a GPS satellite in FIG. 1.

FIG. 5 is a functional block diagram of the GPS satellite included in FIG. 1. The GPS (Global Positioning System) is a locating system developed principally by the U.S. Forces, wherein a total of twenty-four GPS satellites 120 are employed with six orbital planes under conditions of an altitude of approximately 20,000 km, a period of 12 hours and an orbital inclination of 55 degrees. Each GPS satellite 120 has a 90° phase difference generator 122, mixers 124, 126, 128, 130 and 136, a synthesizer 132, an electronic switch 134 and a transmitter 138.

A signal from the GPS satellite 120 is modulated through spectrum spread in PN series, and two-frequency waves of 1575.42 MHz (L1 carrier) and 1227.6 MHz (L2 carrier) are emitted. In the PN series for such spectrum spread, there are prepared P code (Precision Code) and C/A code (Coarse Acquisition Code). The P code has a chip rate of 10.23 Mb/s and a period of one week, wherein L1 and L2 are both modulated. Meanwhile the C/A code has a chip rate of 1.023 Mb/s and a period of about one second, wherein L2 alone is used for transmission.

Figure 6A:
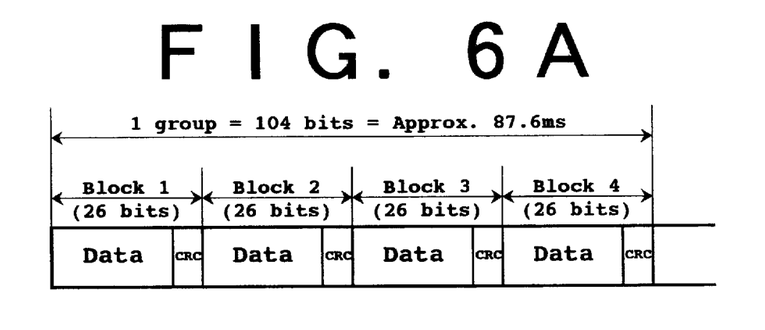
FIG. 6A to FIG. 6D show an exemplary format of a correcting signal.
Figure 6B:
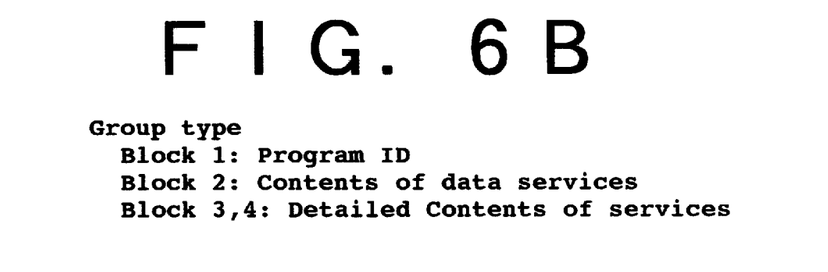
Figure 6C:
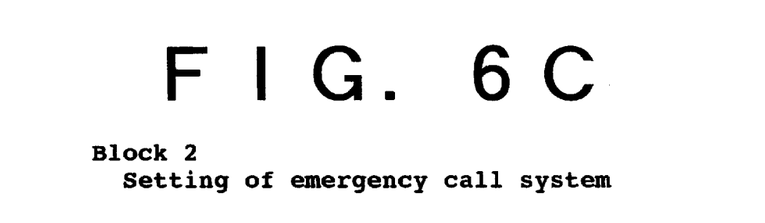
Figure 6D:
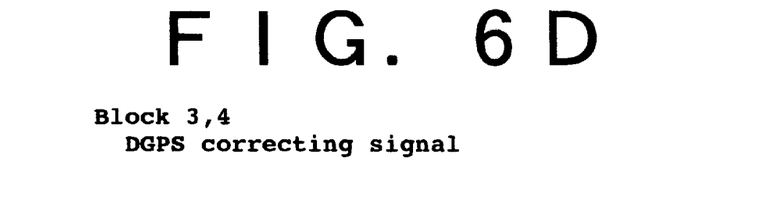

FIG. 6A to FIG. 6D relates to an exemplary format of a correcting signal. FIG. 6A shows an RDBS transmission data format composed of 104 bits and divided into four blocks 1–4, where each block is composed of 26 bits. As shown in FIG. 6B, block 1 represents program ID, block 2 represents the contents of data services, and blocks 3 and 4 represent the detailed contents of the services. In this embodiment, Emergency call system is set in block 2 as shown in FIG. 6C for example, and a correcting signal is set in blocks 3 and 4 as shown in FIG. 6D. The reason for adoption of such RDBS transmission data format resides in enhancing the maintainability of the emergency call system.

Hereinafter the operation of the emergency call system in FIG. 1 will be described in detail below.

(a) Operation of Portable Telephone 2

Figure 7:
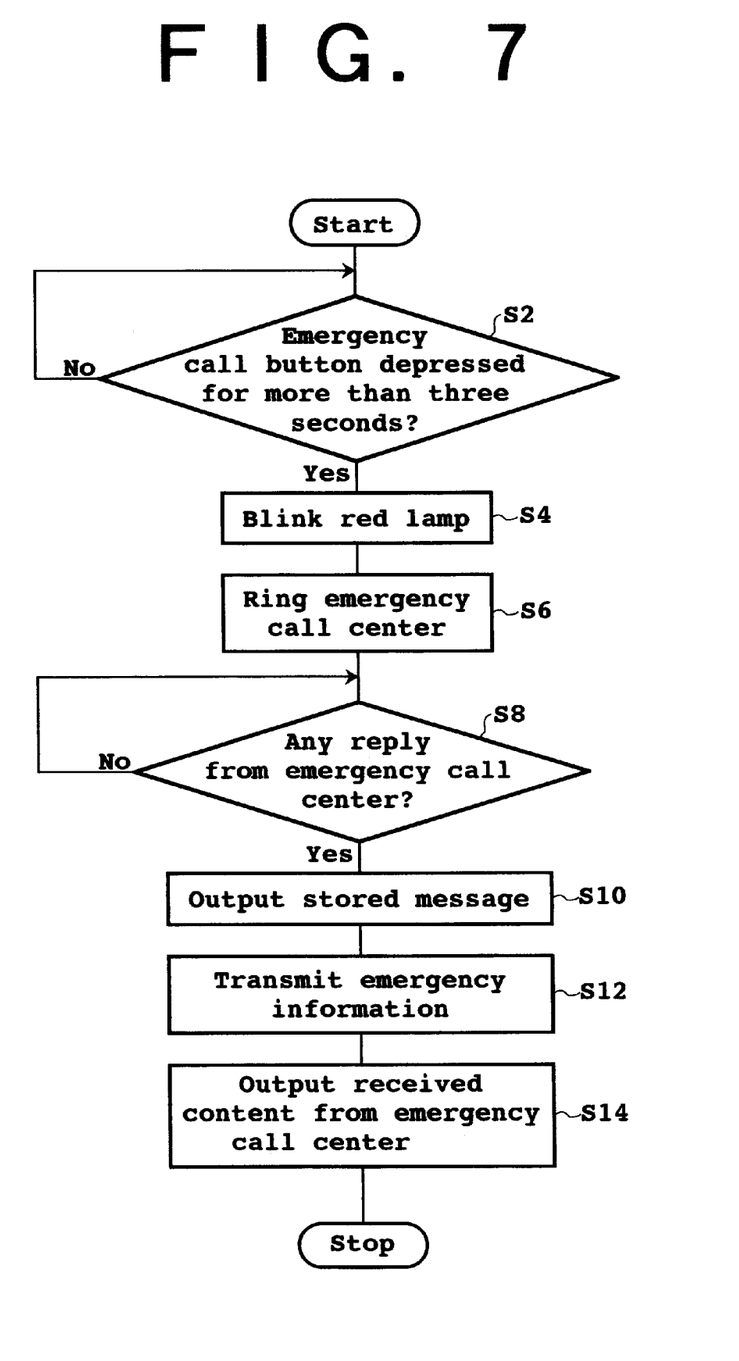
FIG. 7 is a flowchart showing a processing routine of the portable telephone in FIG. 1.

FIG. 7 is a flowchart showing a processing routine of the portable telephone. When going out, the user carries his portable telephone 2 with him. Upon occurrence of any emergent state such as a sudden attack of illness or the like, the user depresses the emergency call button 14. At step S2, the 3-second holding circuit 28 activates an emergent state detection signal after a lapse of three seconds or more from depression of the emergency call button 14.

When the emergent state detection signal is thus activated, the main controller 30 blinks the red lamp 8 at step S4, whereby occurrence of an emergent state to the user is recognized also by persons around the user, so that the necessary primary measure can be taken exactly. Subsequently at step S6, the main controller 30 transmits the dial number of the emergency call center 60, which is stored previously in a memory or the like, to the base station 40 via the TDMA control circuit 20, the RF circuit 18 and the antenna 6. Then, in response to the received dial number, the base station 40 terminates the same at the emergency call center 60 via the exchange station 50.

Meanwhile the GPS antenna 4 always keeps receiving the signals (L1 carrier and L2 carrier) from the transmitter 138 of the GPS satellite 120, and outputs the received signals to the locating processor 26. Subsequently the locating processor 26 demodulates the signal of the L2 carrier channel from the GPS satellite 120 by using the same PN series as in the transmitter, and compares the hour in the receiver and the state of the received PN series to thereby measure the propagation time and locate the position, and then outputs the positional information to the main controller 30.

At step S8, the main controller 30 makes a decision as to whether a reply (off-hook) is received or not from the emergency call center 60. And if the result of this decision is YES, the operation proceeds to step S10. However, if the above result is NO, the operation remains at step S8 to wait until a reply is input. Then at step S10, the main controller 30 reads out the message, which corresponds to the content of the primary measure to be taken for the user, from the message storage 32 and, after converting the message into analog signal by the audio processor 22, outputs the same to the speaker 10.

The message stored in the message storage 32 is a specific one particular to the individual user and written therein by the main controller 30 in accordance with an instruction from the emergency call center 60. The user himself or some person around him takes the primary measure in accordance with the message output from the speaker 10. At step S12, the main controller 30 transmits the emergency information composed of the positional information and user ID such as portable telephone number stored previously in the memory, to the base station 40 via the TDMA control circuit 20, the RF circuit 18 and the antenna 6. Then, in response to the received positional information and user ID, the base station 40 transmits the same to the emergency call center 60 via the exchange station 50.

Upon reception of the positional information and the user ID, as will be described later, the emergency call center 60 makes an arrangement for dispatch of an ambulance or the like from the hospital 130 or the fire station 140 according to the individual information of the user based on the user ID, and notifies the portable telephone 2 of the current situation and the content of the secondary measure to be taken. Thereafter at step S14, the information from the emergency call center 60 is input to the audio processor 22 via the antenna 6, the RF circuit 18 and the TDMA control circuit 20. The audio processor 22 extends the audio signal in compliance with an instruction from the main controller 30 and then outputs the same to the speaker 10. Subsequently the information received from the emergency call center 60 is outputted from the speaker 10, and the user complies with the information.

(b) Operation of DGPS Reference Station 90

The GPS antenna 92 always keeps receiving the signals from the GPS satellites 120 and outputs the same to the GPS receiver 96. Subsequently the GPS receiver 96 demodulates the signal of the L2 carrier channel from the GPS satellite 120 by using the same PN series as in the transmitter. The locating processor 98 compares the hour in the receiver and the state of the received PN series to thereby measure the propagation time and locate the position, and then outputs the positional information to the correcting signal generator 102.

The reference-station position signal generator 100 reads out the fixed positional information of the DGPS reference station 90 from an unshown memory and outputs the information to the correcting signal generator 102. Then the correcting signal generator 102 generates position correcting signals (e.g., aforementioned signals a–g) on the basis of the positional information obtained from the locating processor 98 and the positional information from the reference-station position signal generator 100, and outputs the correcting signals to the data formatter 106.

Subsequently the data formatter 106 edits the correcting signals in a predetermined format such as the one shown in FIGS. 6A–6D and outputs the same to the modulator 108. Then the modulator 108 modulates the input signal into a modem signal for example and outputs the same to the data link transmitter 110. Thereafter the data link transmitter 110 transmits the modem signal to the emergency call center 60 every fixed time via an analog exclusive line or the like.

(c) Operation of Emergency Call Center 60

Figure 8:
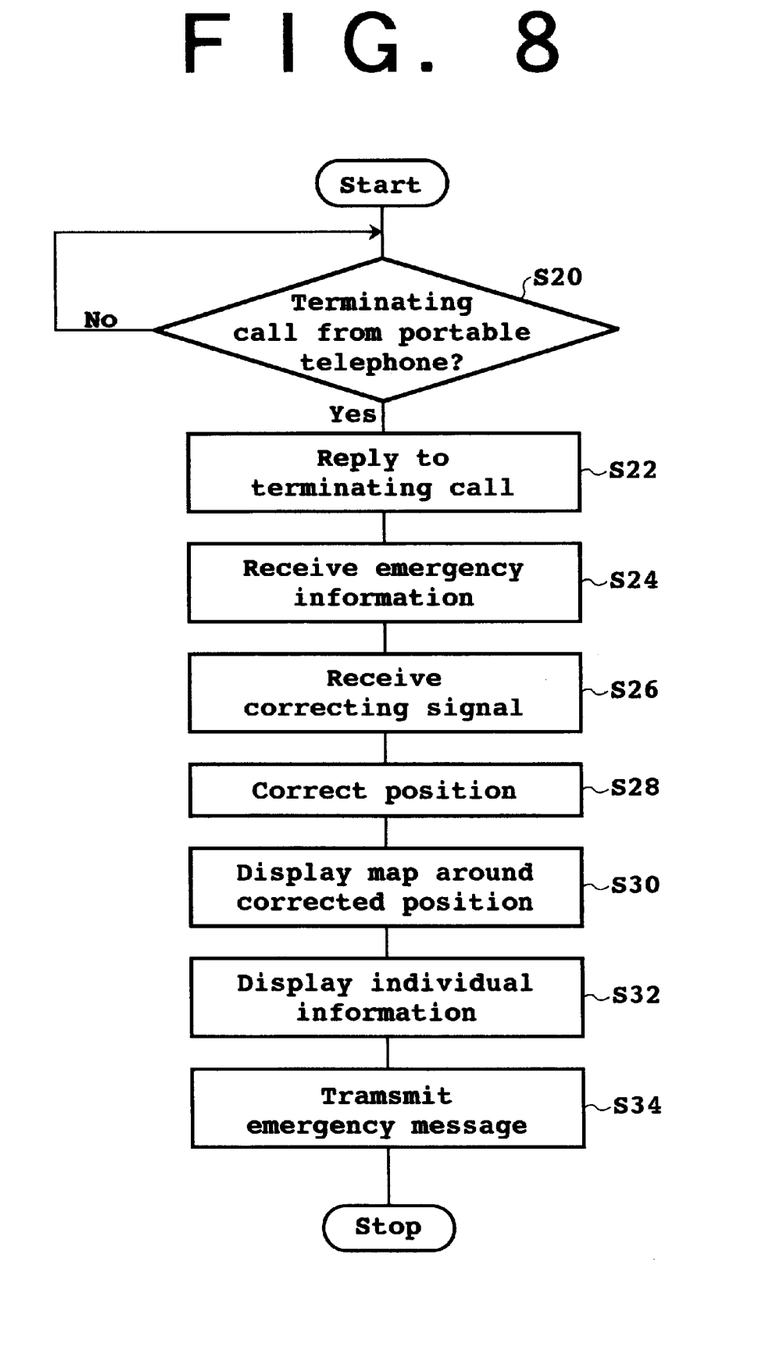
FIG. 8 is a flowchart showing a processing routine of the emergency call center in FIG. 1.

FIG. 8 is a flowchart showing a processing routine of the emergency call center. At step S20, the emergency message receiver/transmitter 61 makes a decision as to whether a terminating call has arrived from the portable telephone 2. And if the result of this decision is YES, the operation proceeds to step S22, where the emergency message receiver/transmitter 61 sends a reply (off-hook) to the portable telephone 2. The emergency message receiver/transmitter 61 receives the user ID and the positional information at step S24, and then outputs the user ID to the system control computer 74 while outputting the positional information to the locating processor 66.

The locating processor 66 receives the positional information at step S24. Thereafter at step S26, the data link receiver 68 receives the correcting signal via an analog exclusive line or the like and then outputs the signal to the data formatter 70. Subsequently the data formatter 70 checks the data validity (CRC check or check if "Emergency call system" being set) and, after confirming that the data are valid, extracts the formatted correcting signals and outputs the same to the differential data processor 72.

At step S28, the differential data processor 72 calculates the correction quantities of latitude and longitude on the basis of the correcting signals and then outputs the same to the locating processor 66. Subsequently the locating processor 66 executes a positional correction of the portable telephone 2 on the basis of the positional information of the portable telephone 2 and the correction quantities obtained from the differential data processor 72, and outputs the corrected positional information to the system control computer 74. The corrected positional information is within an error range of 10 m or so.

At step S30, the system control computer 74 searches the map information database 78 according to the corrected positional information to thereby retrieve the map information of the vicinity including the positional information, and then outputs the retrieved map information to the display device 80. Further at step S32, the system control computer 74 searches the individual information database 76 according to the user ID to thereby retrieve the individual information of the user, and then outputs the same to the display device 80.

Referring to the individual information and the map information displayed on the display device 80, a diagnoser requests the hospital 130 or the fire station 140 to dispatch an ambulance and inputs the emergency message, which represents the current situation and the secondary measure to be taken, from the microphone 62 so as to notify the user of such message. At step S34, the emergency message receiver/transmitter 61 receives the input audio signal from the microphone 62 and then transmits the emergency message to the portable telephone 2 via the exchange station 50 and the base station 40.

Due to execution of the above processing routine, an ambulance or the like is dispatched to the user. In this case, since the positional information is within an error range of 10 m, the user can be found with ease so that the required secondary measure can be taken promptly.

According to the present invention, as described hereinabove, positional information is transmitted to the emergency call center if the emergency switch means is actuated upon occurrence of an emergent state. Consequently, even when the user carrying the emergency call mobile station with him is out, it becomes possible to specify his position to thereby execute a prompt necessary measure for the user without fail.

What is claimed is:

1. An emergency call system having an emergency call mobile station carried by each user to transmit emergency information and an emergency call center to receive the emergency information, said system comprising:

locating means incorporated in said emergency call mobile station for generating first positional information by detecting a position of said mobile station;

emergency switch means incorporated in said emergency call mobile station;

emergent state detection means incorporated in said emergency call mobile station for outputting an emergent state detection signal when said emergency switch means is in its on-state;

transmitting means incorporated in said emergency call mobile station for transmitting the emergency information to said emergency call center in response to the emergent state detection signal, said emergency information including the first positional information and an identification information to specify the user of said emergency call mobile station;

a map information database incorporated in said emergency call center to store map information;

an individual information database incorporated in said emergency call center to store individual information relative to the user which includes the user's clinical record;

emergency information receiving means incorporated in said emergency call center for receiving the emergency information;

display means incorporated in said emergency call center for displaying information thereon;

position display means incorporated in said emergency call center for displaying the map information of the vicinity around the position of said emergency call mobile station on said display means by referring to said map information database on the basis of the first positional information included in the emergency information;

individual information display means incorporated in said emergency call center for displaying the individual information of the user on said display means by referring to said individual information database on the basis of the identification information included in the emergency information;

message storage means incorporated in said emergency call mobile station for storing a voice message to be provided to a user in advance for a first emergency measure;

a speaker incorporated in said emergency call mobile station for emitting an audio output; and message output means incorporated in said emergency call mobile station for outputting the voice message to said speaker in response to the emergent state detection signal.

2. The emergency call system according to claim 1, wherein said emergent state detection means outputs the emergent state detection signal when said emergency switch means is turned on for a predetermined time.

3. The emergency call system according to claim 1, further comprising alarm means incorporated in said emergency call mobile station to notify the outside about occurrence of an emergent state.

4. The emergency call system according to claim 1, wherein said locating means is so formed as to locate the position on the basis of signals from GPS satellites, and said system further comprises position correcting means incorporated in said emergency call center to correct the first positional information on the basis of the correcting information which is calculated by a differential GPS reference station on the basis of both second positional information based on the signals from the GPS satellites and known third positional information.

5. The emergency call system according to claim 1, wherein said transmitting means performs transmission to said emergency call center in conformity with the same communication procedure as that of a cellular telephone.

6. An emergency call system according to claim 1, further comprising:

second transmitting means incorporated in said emergency call center for transmitting a second voice message concerning second measures for the user generated in response to the individual information stored in said individual information database to said emergency call mobile station; and receiving means incorporated in said emergency call mobile station for receiving the second voice message.

* * * * *